Dec. 10, 1968

E. C. LETTER 3,415,591

HIGH SPEED OPTICAL SHUTTER

Filed Jan. 3, 1964

EUGENE C. LETTER
INVENTOR.

BY *Frank C. Parker*
*David Dougherty*
ATTORNEYS 3,415,591
HIGH SPEED OPTICAL SHUTTER
Eugene C. Letter, Penfield, N.Y., assignor to Bausch & Lomb Incorporated, Rochester, N.Y., a corporation of New York
Filed Jan. 3, 1964, Ser. No. 335,691
5 Claims. (Cl. 350—160)

ABSTRACT OF THE DISCLOSURE

A high speed optical shutter which may be opened or closed in less than 50 microseconds by the vaporizing action of mercury deposited on one of the optical shutters thereof.

---

This invention relates to an optical element and more particularly to a high speed optical shutter.

Studies of combustion, corona discharge, explosions, plastic and elastic deformation and shock wave phenomena frequently call for detailed photographs taken at shutter speeds of a few microseconds. Ballistics dynamic testing and chemical reactions also require pictures taken at similar speeds. At their relatively high speeds, it is also desirable to shutter a relatively large aperture. For example, a relatively large aperture allows adequate light to enter the optical system during the relatively short time intervals.

A high speed optical shutter according to the present invention may be opened or closed in less than 50 microseconds. Accordingly, a system of this type may be used in combination with framing cameras. Further, because of the relatively large aperture which can be opened and closed at high speed, the devices are particularly applicable in any area requiring a relatively high speed light valve. Additionally, a shutter or light valve according to the invention may be triggered by an event itself. For example, a flash of light may be used to trigger the valve or electronic means may be incorporated for that purpose.

Briefly, an optical element according to the present invention comprises a pair of optical transmitting members which are spaced from each other but disposed in optical series. For example, the members may comprise a pair of spaced superposed glass plates. One of the plates defines a reservoir which is filled with an electrically conducting fluid. The reservoir according to the preferred embodiment of the invention comprises a plurality of relatively narrow channels which are at least partially filled with mercury. Means are provided for vaporizing the liquid and depositing the vapor on the confronting surface of the second transmitting member, that is, on the surface facing the reservoir. The vapor condenses on the surface of the second member to thereby change the reflective characteristics thereof, that is, it reflects instead of transmits.

Figure 2:
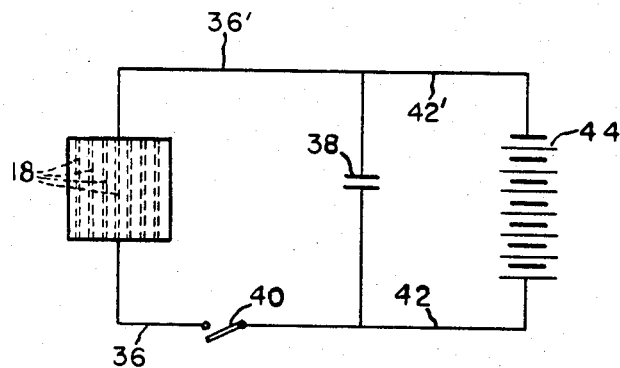
Figure 1:
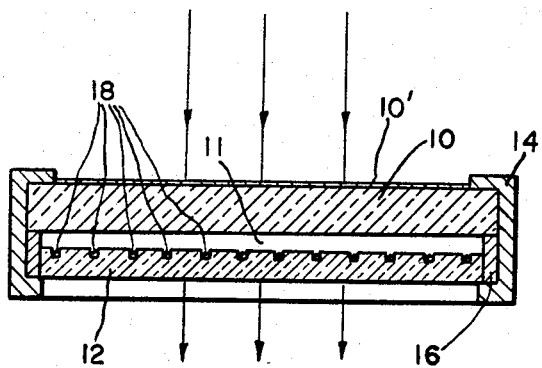

The invention will now be described in more detail in connection with the accompanying drawings; in which, FIG. 1 is a cross-sectional view of an optical element or light valve according to the present invention; and, FIG. 2 is a schematic diagram showing electrical means for charging the reflective characteristics of the element shown in FIG. 1.

An optical element according to the present invention includes a pair of flat glass plates 10 and 12 which are disposed in a housing 14. The plates 10, 12 are preferably plane, parallel plates which are superposed in spaced relation to each other. A spacer 16 may be used for positioning the plates 10 and 12 within the housing 14. The lower plate 12 includes a plurality of relatively narrow channels 18 which are at least partially filled with mercury.

The channels 18 are relatively narrow with respect to the diameter of the aperture. For example, the area covered by the channels 18 is approximately 30% of the aperture of the light valve. This ratio allows approximately 70% transmission. An anti-reflective coating 10' may be applied to the top surface of the plate 10 in order to improve the transmission through the device when the light valve is in an open or transmitting condition. The other surfaces may also be coated with an anti-reflectant.

A spacing 11 which separates the plates 10 and 12 is relatively small with respect to the aperture, that is, the spacing is preferably approximately 1/16" or less in thickness for a device having an aperture of approximately 1" in diameter. This spacing is also relatively small with respect to the thickness of the plate 10 which in the preferred embodiment of the invention is on the order of 3/8" to 1/2" thickness for an aperture of up to 1" diameter.

The relative thickness of the plate 10 and spacing 11 are selected in view of various practical limitations. For example, the plate 10 acts as a heat sink on which the mercury vapor condenses. The spacing 11 determines the distance the vapor travels before it is deposited on the plate 10 and accordingly should be relatively small in order to minimize the time lapse between vaporization and condensation. The spacing also determines to some extent the thickness of the channels 18 which determine the mercury film coverage on the surface of the plate 10 as well as the maximum transmission of the light valve when it is in an open condition.

The channels 18 are connected by leads 36, 36' in parallel with a capacitor 38 when a switch 40 is closed. The capacitor 38 is connected by the leads 42, 42' to electric means 44 for producing a high voltage electrical discharge of between 2000 and 3000 volts. The capacitor 38 in one embodiment of the invention has a capacitance of between 50 and 100 micro-farads. The capacitor is charged by the high voltage supply 44 and discharges through the mercury which is disposed in the channels 18 when the switch 40 is closed. The electrical discharge passing through the fluid vaporizes the mercury which is deposited on the surface of the element 10 to thereby close the light valve. The shutter may be reopened by raising the temperature of the plate which allows the mercury to vaporize and return to the relatively narrow channels.

What is claimed is:

1. An optical element comprising an electrical conducting liquid, a pair of spaced transmitting members disposed optically in series, one of said members defining a reservoir confining said liquid, means vaporizing said liquid and depositing said liquid on the surface of the other transmitting member whereby said vapor condenses on the surface of said other transmitting member to thereby change the reflective characteristics thereof and means raising the temperature of the other transmitting member whereby the liquid deposited thereon will revaporize and return to said reservoir thereby changing the reflective characteristics of the other transmitting member.

2. An optical element according to claim 1 in which the pair of spaced transmitting members are superposed and the reservoir comprises a plurality of relatively narrow channels which are narrow with respect to the aperture of the element.

3. An optical element according to claim 1 in which said vaporizing means comprises a capacitor and a source of high voltage for producing a discharge through said liquid.

4. An optical element according to claim 3 in which the electrical conducting fluid consists of mercury and the capacitor has a capacitance in the range of 50 to 100 micro-farads, and the source of high voltage supplies between 2000 and 3000 volts.

5. An optical element according to claim 2 in which the plurality of relatively narrow channels covers substantially 30% of the surface area thereby allowing substantially 70% transmission of light when the optical element is opened.

References Cited

UNITED STATES PATENTS 3,008,374 11/1961 Kreisman ---------- 350—267
3,245,313 4/1966 Zaromb ------------ 350—160

OTHER REFERENCES

Edgerton and Strabala: "Rapid-Closing Electronically-Operated Shutter," Rev. Sci. Instr., vol. 27, No. 3, p. 162 (March 1956).

DAVID SCHONBERG, *Primary Examiner.*

P. R. MILLER, *Assistant Examiner.*

U.S. Cl. X.R.

350—267